Figure 1:
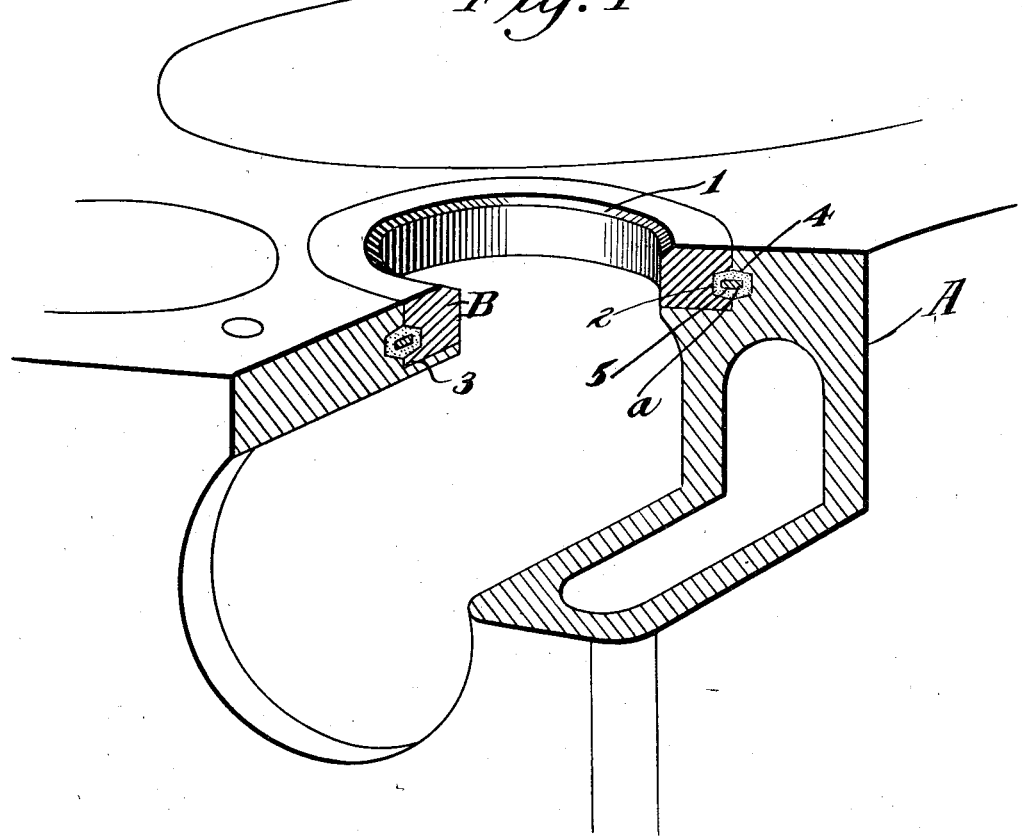

March 25, 1930.  F. E. SMITH  1,751,664

VALVE SEAT

Filed Nov. 20, 1928

INVENTOR,
Frederick E. Smith,
BY Calvin Brown
ATTORNEY.

Patented Mar. 25, 1930

1,751,664

UNITED STATES PATENT OFFICE

FREDERICK E. SMITH, OF SANTA PAULA, CALIFORNIA

VALVE SEAT

Application filed November 20, 1928. Serial No. 320,573.

This invention relates to valve seats, and in particular to a replacement unit.

The invention has for an object the provision of a valve seat which may supplant and take the place of an original valve seat and which will be as satisfactory in use and service as such original valve seat.

In a particular embodiment of the invention, I utilize the valve seat for replacing worn or out of center valve seats, such as sometimes are present in internal combustion engines. The seat is so arranged and constructed as to render the same easy of application to the engine block and when placed in position, it will have all the properties of the original valve seat in that the same will lock tight to said block.

The invention contemplates a valve seat which is inexpensive of manufacture and which in use may be readily installed without the necessity of using complicated tools, and installed within a minimum of time, not requiring any particular mechanical ability for such installation.

In practicing an embodiment of the invention, I provide an annulus having a tapered face, and which annulus is adapted to be placed within the opening of the valve seat it is to replace. The original opening in the casing, assuming an internal combustion block, may have to be reamed to form a shoulder and likewise provided with an annular groove in the side wall of said opening. The replacement valve seat would be provided on its periphery with a groove and within said groove and likewise extending beyond the periphery of the annulus is a spring ring. This spring ring is of the split type and may be readily collapsed within the groove of the annulus whereby the said annulus when confined within the opening prepared for the same in the engine block will be locked in position by the spring expanding into the groove prepared in the block. In addition to said spring ring, a cement may be included within the groove of the annulus, which cement is likewise received in the prepared groove of the engine block, such a cement having the properties of expansion and contraction the same as the engine block.

With the above mentioned and other objects in view, including simplicity of manufacture, the invention consists in the novel and useful provision, formation, construction, association and relative arrangement of parts, members and features, all as shown in a certain embodiment in the accompanying drawing, described generally and more particularly pointed out in the claims.

Figure 2:
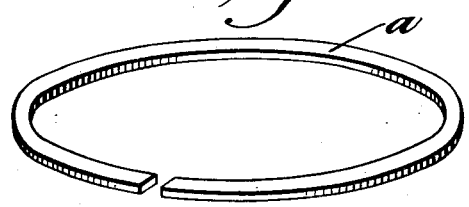

In the drawing:

Figure 1 is a perspective view, partly in section, of an engine block and showing the improved seat in position, and, Figure 2 is a perspective view of one member of the invention.

Referring now with particularity to the drawing, there is shown at A an engine block and at B the replacement valve seat: This replacement valve seat constitutes an annulus, a portion of which is provided with a beveled face 1 with the periphery of said annulus grooved at 2. This groove is adapted to receive a split ring a, and which split ring when not compressed so that the ends thereof are caused to approach or bridge will be totally confined within said groove 2. The groove to this end has a depth sufficient to confine the ring although when the ring is expanded, the said ring will have a portion thereof extending outwardly from said groove and beyond the periphery of the annulus.

This type of valve seat may, of course, be utilized for various purposes but in particular I have adapted this valve seat as a replacement unit for internal combustion engines.

It is a known fact that the valve seats in an internal combustion engine become worn and pitted with the beveled face portions out of round or true, with the result that a valve does not properly seat with resultant compression losses and general motor inefficiency. When this occurs, the original valve seat will, of course, be cut away by reaming the same so as to form a shoulder, such as illustrated at 3. The inner diameter of the replacement valve seat will have the same inner diameter as the original valve seat opening. Thus the casting will assume the general appearance as shown in Figure 1 and said annulus, when placed in position will rest against the shoulder 3. The block, in addition to being recessed so as to receive the annulus of the replacement unit must be provided with a circular groove 4 which is directly opposite and complementary to the annular groove 2 when the annulus is positioned within the recess of the block. The said replacement rings may be made in any size desired and the size will in a measure depend upon the closeness of the different valves. Furthermore, the said replacement unit may be loosely positioned within the recess of the block; in fact this is most desirable where there is a cracked block or head. In addition to the ring a, I preferably place within the grooves 2 and 4 a cement, such as the well known iron cement, which consists of a material adapted to be mixed with water to form a paste, and which cement has certain properties that render the same expansible and contractible with the block or head. This cement is adapted to harden under influence of heat.

The operation, uses and advantages of the invention are as follows:

Having recessed the block to receive a new valve seat, the grooves 2 and 4 are filled with cement and the ring a is collapsed within said groove so that the replacement unit or annulus may be placed within said recess. When the annulus is properly positioned within the recess of the block, the ring a will expand so as to bridge the space between the block and the ring, as shown in Figure 1 at 5. When the cement has hardened, it will be evident that it would be extremely difficult to remove the valve seat as the ring will aid in preventing such removal; in fact, the ring would function to hold the valve seat in position even if the cement were totally destroyed or no cement was present. This is a valuable feature because sometimes cylinder heads will crack and if only cement was present the valve seat might escape from the recess but this would be impossible by the present arrangement due to the presence of the ring a.

It is obvious that various changes and modifications and variations may be made in practicing the invention in departure from the particular showing of the drawing without departing from the true spirit thereof.

I claim:

1. As a new article of manufacture, a valve seat comprising an annulus formed with a peripheral groove, and an expansible ring within said groove and adapted to project beyond the periphery of said annulus.

2. The combination with an engine block having a recessed valve port and a groove facing said port, of a valve seat formed with a groove, adapted to be placed within said recess of the block, and an expansible member adapted to bridge the grooves of the valve seat and engine block for locking the valve seat to the engine block.

3. The combination with an engine block having a recessed valve port and a groove facing said port, of a valve seat formed with a groove, adapted to be placed within said recess of the block, an expansible member adapted to bridge the grooves of the valve seat and engine block for locking the valve seat to the engine block, and plastic means surrounding said expansible member adapted to subsequently harden for positioning said expansible member.

In testimony whereof, I have signed my name to this specification at Santa Paula, California, this 3 day of October, 1928.

FREDERICK E. SMITH.